(12) United States Patent
Sidelkovskiy et al.

(10) Patent No.: US 11,548,652 B2
(45) Date of Patent: Jan. 10, 2023

(54) NACELLE

(71) Applicant: RAYTHEON TECHNOLOGIES CORPORATION, Farmington, CT (US)

(72) Inventors: Dmitriy B. Sidelkovskiy, Ellington, CT (US); Steven H. Zysman, Amston, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 60 days.

(21) Appl. No.: 17/327,048

(22) Filed: May 21, 2021

(65) Prior Publication Data
US 2022/0063823 A1    Mar. 3, 2022

Related U.S. Application Data

(62) Division of application No. 15/660,687, filed on Jul. 26, 2017, now Pat. No. 11,046,445.

(51) Int. Cl.
*F02C 3/04* (2006.01)
*F02K 1/72* (2006.01)
(Continued)

(52) U.S. Cl.
CPC ............. *B64D 29/00* (2013.01); *B64D 27/18* (2013.01); *B64D 29/02* (2013.01); *B64D 33/04* (2013.01);
(Continued)

(58) Field of Classification Search
CPC ........ B64D 29/00; B64D 27/18; B64D 29/02; B64D 33/04; B64D 2033/0286;
(Continued)

(56) References Cited

U.S. PATENT DOCUMENTS 3,500,646 A    3/1970 Hom et al.
3,779,010 A    12/1973 Chamay
(Continued)

FOREIGN PATENT DOCUMENTS

EP    1416147    5/2004
EP    2592002    5/2013
(Continued)

OTHER PUBLICATIONS

USPTO, Final Office Action dated Jan. 18, 2022 in U.S. Appl. No. 16/984,424.
(Continued)

*Primary Examiner* — Ehud Gartenberg
*Assistant Examiner* — Henry Ng
(74) *Attorney, Agent, or Firm* — Snell & Wilmer L.L.P.

(57) ABSTRACT

A nacelle may comprise an inlet cowling comprising an inlet cowling aft edge having an aft edge length; a boat tail cowling comprising a boat tail cowling forward edge having a forward edge length, wherein the boat tail cowling forward edge is disposed adjacent to the inlet cowling aft edge. The forward edge length may be shorter than the aft edge length, forming a step being defined by a portion of the inlet cowling aft edge that is radially outward of the boat tail cowling forward edge. The nacelle may further comprise a transition fairing coupled to the boat tail cowling, wherein the transition fairing comprises a fairing forward edge disposed adjacent to the inlet cowling aft edge and a fairing ramp surface spanning between the inlet cowling aft edge and a boat tail cowling external surface.

4 Claims, 7 Drawing Sheets

(51) Int. Cl.
*F02K 3/06* (2006.01)
*B64D 29/00* (2006.01)
*B64D 27/18* (2006.01)
*B64D 29/02* (2006.01)
*B64D 33/04* (2006.01)
*B64D 33/02* (2006.01)

(52) U.S. Cl.
CPC .................. *F02C 3/04* (2013.01); *F02K 1/72* (2013.01); *B64D 2033/0286* (2013.01); *F02K 3/06* (2013.01); *F05D 2220/323* (2013.01); *F05D 2240/14* (2013.01)

(58) Field of Classification Search
CPC ... B64D 29/06; F02C 3/04; F02K 1/72; F02K 3/06; F02K 1/625; F02K 1/68; F02K 1/80; F02K 1/82; F05D 2220/323; F05D 2240/14
See application file for complete search history.

(56) References Cited

U.S. PATENT DOCUMENTS

| | | |
|---|---|---|
| 3,831,376 A | 8/1974 | Moorehead |
| 3,837,411 A | 9/1974 | Nash |
| 6,000,216 A | 12/1999 | Vasuchel |
| 6,945,031 B2 | 9/2005 | Lair |
| 6,968,675 B2 | 11/2005 | Ramlaoui |
| 7,484,356 B1 | 2/2009 | Lair |
| 7,600,384 B2 | 10/2009 | Chanez |
| 7,708,230 B2 | 5/2010 | Cloft |
| 8,256,204 B2 | 9/2012 | Hatrick |
| 8,256,225 B2 | 9/2012 | Baltas |
| 8,365,515 B2 | 2/2013 | Migliaro, Jr. |
| 8,677,733 B2 | 3/2014 | Beardsley |
| 8,793,973 B2 | 8/2014 | Vauchel |
| 9,133,789 B2 | 9/2015 | Vasuchel |
| 9,562,595 B2 | 2/2017 | Caruel |
| 10,247,136 B2 | 4/2019 | Stuart |
| 11,046,445 B2 | 6/2021 | Sidelkovskiy |
| 2001/0010148 A1 | 8/2001 | Michel |
| 2007/0234707 A1 | 10/2007 | Beardsley |
| 2008/0206044 A1 | 8/2008 | Porte et al. |
| 2009/0107108 A1 | 4/2009 | Vauchel |
| 2009/0188233 A1 | 7/2009 | Vauchel |
| 2010/0269511 A1 | 10/2010 | Vauchel |
| 2012/0045319 A1 | 2/2012 | Snyder et al. |
| 2013/0025259 A1 | 1/2013 | Beardsley et al. |
| 2014/0027536 A1 | 1/2014 | Gormley |
| 2014/0030057 A1 | 1/2014 | Gormley |
| 2014/0086678 A1 | 3/2014 | Cazuc et al. |
| 2014/0283501 A1 | 9/2014 | Schwarz |
| 2017/0204810 A1 | 7/2017 | Harpal |
| 2017/0211510 A1 | 7/2017 | Smith |
| 2017/0328304 A1 | 11/2017 | Gormley |
| 2020/0165981 A1 | 5/2020 | Schreiber |

FOREIGN PATENT DOCUMENTS

| | | |
|---|---|---|
| EP | 2725218 | 4/2014 |
| EP | 2728152 | 5/2014 |
| EP | 3434597 | 1/2019 |
| WO | 9814698 | 4/1998 |

OTHER PUBLICATIONS

USPTO, Non-Final Office Action dated Sep. 14, 2021 in U.S. Appl. No. 16/984,424.
USPTO, Notice of Allowance dated May 15, 2020 in U.S. Appl. No. 15/660,656.
USPTO, Final Office Action dated Jul. 30, 2019 in U.S. Appl. No. 15/660,656.
USPTO, Advisory Action dated Oct. 11, 2019 in U.S. Appl. No. 15/660,656.
European Patent Office, European Search Report dated Dec. 3, 2018 in Application No. 18183910.1.
European Patent Office, European Search Report dated Dec. 3, 2018 in Application No. 18182767.6.
USPTO, Non-Final Office Action dated Jan. 28, 2019 in U.S. Appl. No. 15/660,656.
USPTO, Restriction/Election Requirement dated Oct. 11, 2018 in U.S. Appl. No. 15/660,656.
Sidelkovskiy, et al., U.S. Appl. No. 15/660,656, filed Jul. 26, 2017 and entitled "Nacelle."
Schlichting, "Boundary-Layer Theory," Sixth Edition, 1968, pp. 472-473, McGraw-Hill Book Co.
Van Dyke, "An Album of Fluid Motion," 1982, p. 40, The Parabolic Press.
USPTO, Non-Final Office Action dated Feb. 4, 2020 in U.S. Appl. No. 15/660,656.
European Patent Office, European Office Action dated Dec. 17, 2019 in European Application No. 18183910.1.
USPTO, Restriction/Election Requirement dated Apr. 26, 2019 in U.S. Appl. No. 15/660,687.
USPTO, Non-Final Office Action dated Jul. 29, 2019 in U.S. Appl. No. 15/660,687.
USPTO, Final Office Action dated Feb. 4, 2020 in U.S. Appl. No. 15/660,687.
USPTO, Non-Final Office Action dated Dec. 7, 2020 in U.S. Appl. No. 15/660,687.
USPTO, Notice of Allowance dated Mar. 24, 2021 in U.S. Appl. No. 15/660,687.
Sidelkovskiy, et al., U.S. Appl. No. 16/984,424, filed Aug. 4, 2020 and entitled "Nacelle."
USPTO, Advisory Action dated Mar. 22, 2022 in U.S. Appl. No. 16/984,424.
USPTO, Notice of Allowance dated Apr. 20, 2022 in U.S. Appl. No. 16/984,424.

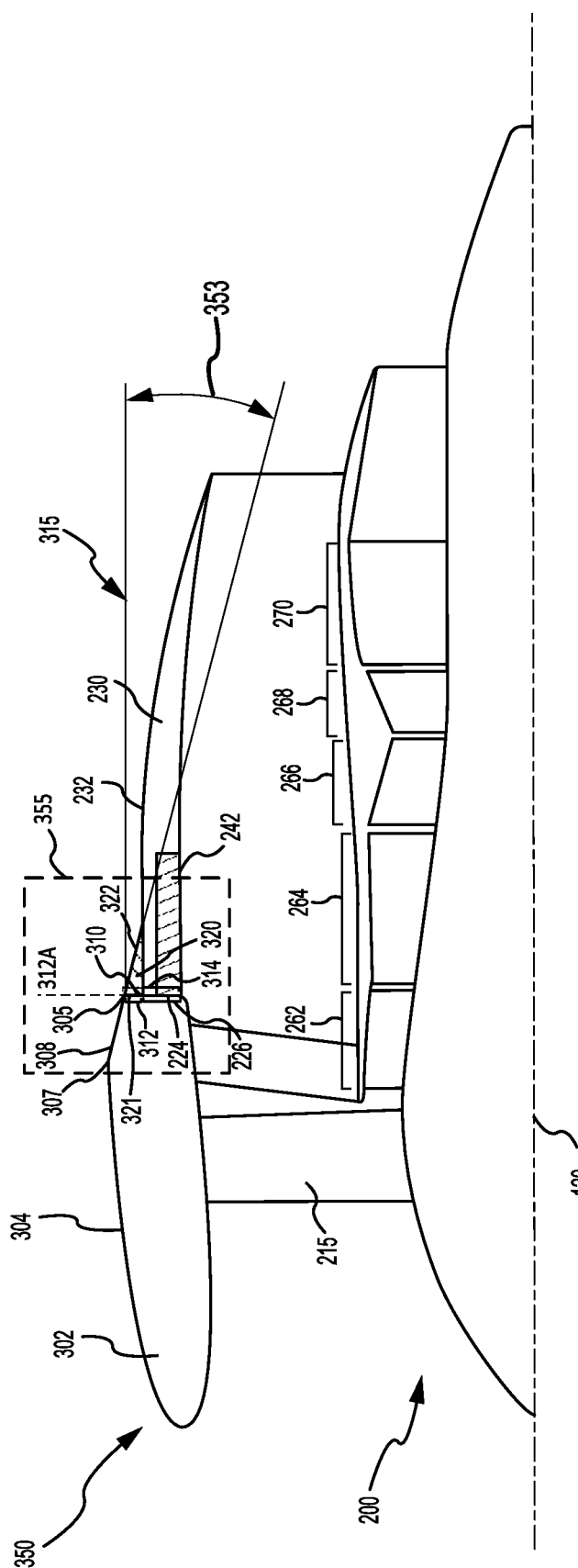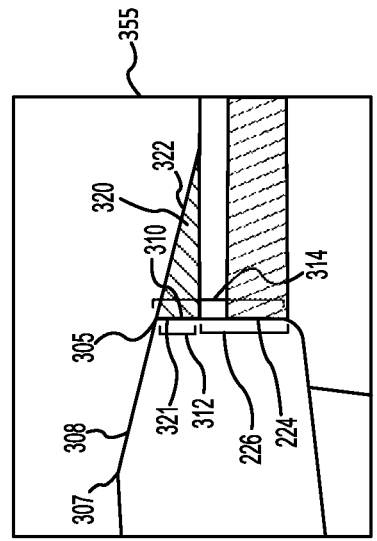
FIG. 3A
FIG. 3B

NACELLE

CROSS-REFERENCE TO RELATED APPLICATIONS

This application is a divisional of, and claims priority to and the benefit of, U.S. patent application Ser. No. 15/660,687, filed Jul. 26, 2017 and entitled "NACELLE," which is hereby incorporated in its entirety by reference herein for all purposes.

FIELD

This disclosure generally relates to nacelles on aircraft.

BACKGROUND

A nacelle is a casing or housing that holds an engine and/or other equipment on an aircraft. Nacelles are often coupled to an underside of an aircraft wing, for example, by a pylon. Nacelles are typically designed to enhance aerodynamic efficiency, and to fit under the aircraft wing without hanging too close to, or contacting, the ground.

SUMMARY

In various embodiments, a nacelle encircling an engine about an axis of rotation may comprise an inlet cowling defining an inlet of the nacelle, wherein the inlet cowling comprises an inlet cowling maximum point and an inlet cowling aft edge, wherein the inlet cowling aft edge comprises an aft edge length; and a boat tail cowling disposed aft of the inlet cowling, wherein the boat tail cowling comprises a boat tail cowling forward edge having a forward edge length, and wherein the boat tail cowling forward edge is disposed adjacent to the inlet cowling aft edge. In various embodiments, the forward edge length may be shorter than the aft edge length, forming a step, the step being defined by a portion of the inlet cowling aft edge that is radially outward of the boat tail cowling forward edge. The nacelle may further comprise a transition fairing coupled to a boat tail cowling external surface of the boat tail cowling, wherein the transition fairing may comprise a fairing forward edge disposed adjacent to the inlet cowling aft edge and a fairing ramp surface providing a transition surface between the inlet cowling aft edge and the boat tail cowling external surface. In various embodiments, the transition fairing may be integral with the boat tail cowling.

In various embodiments, the nacelle may further comprise a thrust reverser coupled to the inlet cowling and the boat tail cowling, wherein the boat tail cowling may be configured to translate in an aft direction, wherein the boat tail cowling forward edge is disposed adjacent to the inlet cowling aft edge when the boat tail cowling is in a forward-most configuration, and wherein the thrust reverser is configured to be in an exposed configuration in response to the boat tail cowling translating in the aft direction. In various embodiments, the step may be disposed forward of the thrust reverser, and the transition fairing may be disposed radially outward of the thrust reverser. In various embodiments, the inlet cowling may comprise a convergent surface between the inlet cowling maximum point and an outer point of the inlet cowling aft edge. In various embodiments, the fairing ramp surface may span between the boat tail cowling external surface and the outer point. In various embodiments, the convergent surface and the fairing ramp surface may be flush. In various embodiments, the fairing ramp surface may span between the boat tail cowling external surface and a point along inlet cowling aft edge that is radially inward of the outer point. In various embodiments, a transition angle formed between the fairing ramp surface and a reference line parallel to the axis of rotation may be between 10 and 20 degrees. In various embodiments, at least a portion of the inlet cowling aft edge comprises an angled portion. In various embodiments, an angle formed between the angled portion and a reference line parallel to the axis of rotation may be between 45 and 90 degrees.

In various embodiments, an aircraft may comprise a gas turbine engine; and a nacelle encircling the gas turbine engine. The nacelle may comprise an inlet cowling defining an inlet of the nacelle, wherein the inlet cowling comprises an inlet cowling maximum point and an inlet cowling aft edge, wherein the inlet cowling aft edge comprises an aft edge length; and a boat tail cowling disposed aft of the inlet cowling, wherein the boat tail cowling comprises a boat tail cowling forward edge having a forward edge length, and wherein the boat tail cowling forward edge is disposed adjacent to the inlet cowling aft edge. The forward edge length may be shorter than the aft edge length, forming a step, the step being defined by a portion of the inlet cowling aft edge that is radially outward of the boat tail cowling forward edge. The nacelle may further comprise a transition fairing coupled to a boat tail cowling external surface of the boat tail cowling, wherein the transition fairing comprises a fairing forward edge disposed adjacent to the inlet cowling aft edge and a fairing ramp surface providing a transition surface between the inlet cowling aft edge and the boat tail cowling external surface. In various embodiments, the transition fairing may be integral with the boat tail cowling.

In various embodiments, the nacelle of the aircraft may further comprise a thrust reverser coupled to the inlet cowling and the boat tail cowling, wherein the boat tail cowling may be configured to translate in an aft direction, wherein the boat tail cowling forward edge is disposed adjacent to the inlet cowling aft edge when the boat tail cowling is in a forward-most configuration, and wherein the thrust reverser is configured to be in an exposed configuration in response to the boat tail cowling translating in the aft direction. In various embodiments, the step may be disposed forward of the thrust reverser and the transition fairing may be disposed radially outward of the thrust reverser. In various embodiments, the inlet cowling may comprise a convergent surface between the inlet cowling maximum point and an outer point of the inlet cowling aft edge. In various embodiments, the fairing ramp surface may span between the boat tail cowling external surface and the outer point. In various embodiments, the fairing ramp surface may span between the boat tail cowling external surface and a point along inlet cowling aft edge that is radially inward of the outer point. In various embodiments, a transition angle formed between the fairing ramp surface and a reference line parallel to the axis of rotation may be between 10 and 20 degrees.

In various embodiments, a nacelle configured to encircle an engine disposed about an axis of rotation may comprise an inlet cowling defining an inlet, wherein the inlet cowling comprises an inlet cowling aft edge; and a boat tail cowling comprising a radial flange protruding radially outward from a boat tail cowling forward portion, wherein the radial flange comprises a boat tail forward edge disposed adjacent to the inlet cowling aft edge. In various embodiments, the boat tail cowling may comprise a step formed by a flange outer point of the radial flange being more radially outward from the axis of rotation than a laminar portion distance of the boat tail cowling, the step being defined by a portion of the radial flange that is radially outward of the laminar portion distance. In various embodiments, the nacelle may further comprise a transition fairing coupled to a boat tail cowling external surface of the boat tail cowling, wherein the transition fairing comprises a fairing forward edge disposed adjacent to the radial flange and a fairing ramp surface providing a transition surface between the radial flange and the boat tail cowling external surface.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures. Elements with the like element numbering throughout the figures are intended to be the same.

FIGS. 3A and 3B illustrate a nacelle comprising a transition fairing between cowlings with a convergent surface, in accordance with various embodiments;

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1A:
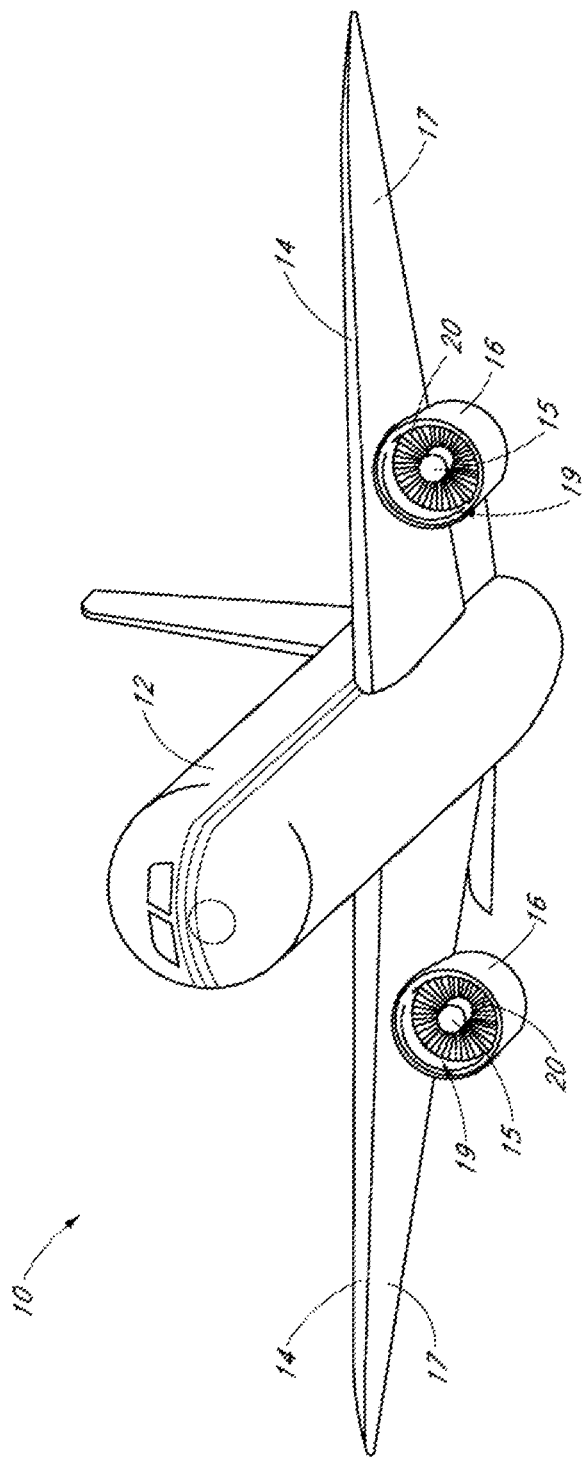
FIG. 1A illustrates a perspective view of an aircraft incorporating a nacelle, in accordance with various embodiments.

In various embodiments, and with reference to FIG. 1A an aircraft 10 is depicted. Aircraft 10 may have a fuselage 12 and a pair of wings 14 extending laterally from the fuselage 12. A nacelle 16 is coupled to an underside of each wing 14. Although not illustrated in FIG. 1A, in various embodiments, each nacelle 16 is coupled to a wing 14 by a pylon, or any other suitable structure capable of coupling a load to a wing 14.

Each nacelle 16 may house an aircraft engine 15, for example, a high bypass ratio engine, which receives air through a fan 20 disposed near an inlet 19 of the nacelle 16, combusts the received air with fuel within a combustion chamber, and provides an exhaust jet through a rear-facing nozzle to propel the aircraft 10 in a forward direction. Additionally, high bypass ratio engines also receive a substantial amount of air through the inlet 19 of the nacelle 16 that is passed over or bypasses the engine 15 to provide additional thrust. The bypass air is combined with the exhaust jet and improves fuel efficiency and engine noise. In various embodiments, the nacelle 16 can include a variable area fan nozzle cowling configured to vary an outlet area through which the bypass air can pass through. Because a high bypass ratio engine may be associated with a large diameter fan 20, such engines can require a larger nacelle that must be disposed near the underside 17 of the wing 14 in order to provide for necessary clearance between the nacelle and a landing surface such as a runway.

With further reference to FIG. 1A, during flight, air flows through the inlet 19 of each nacelle 16 as well as over the outer surfaces of each nacelle 16. The outer surfaces of the nacelle 16 may be formed by various cowlings that are joined together to form the nacelle. The greater the surface area of nacelle 16 (i.e., the area in contact with external airflow during flight) formed by the various cowlings, the greater the external drag on the nacelle 16 and aircraft 10 as a whole.

Figure 1B:
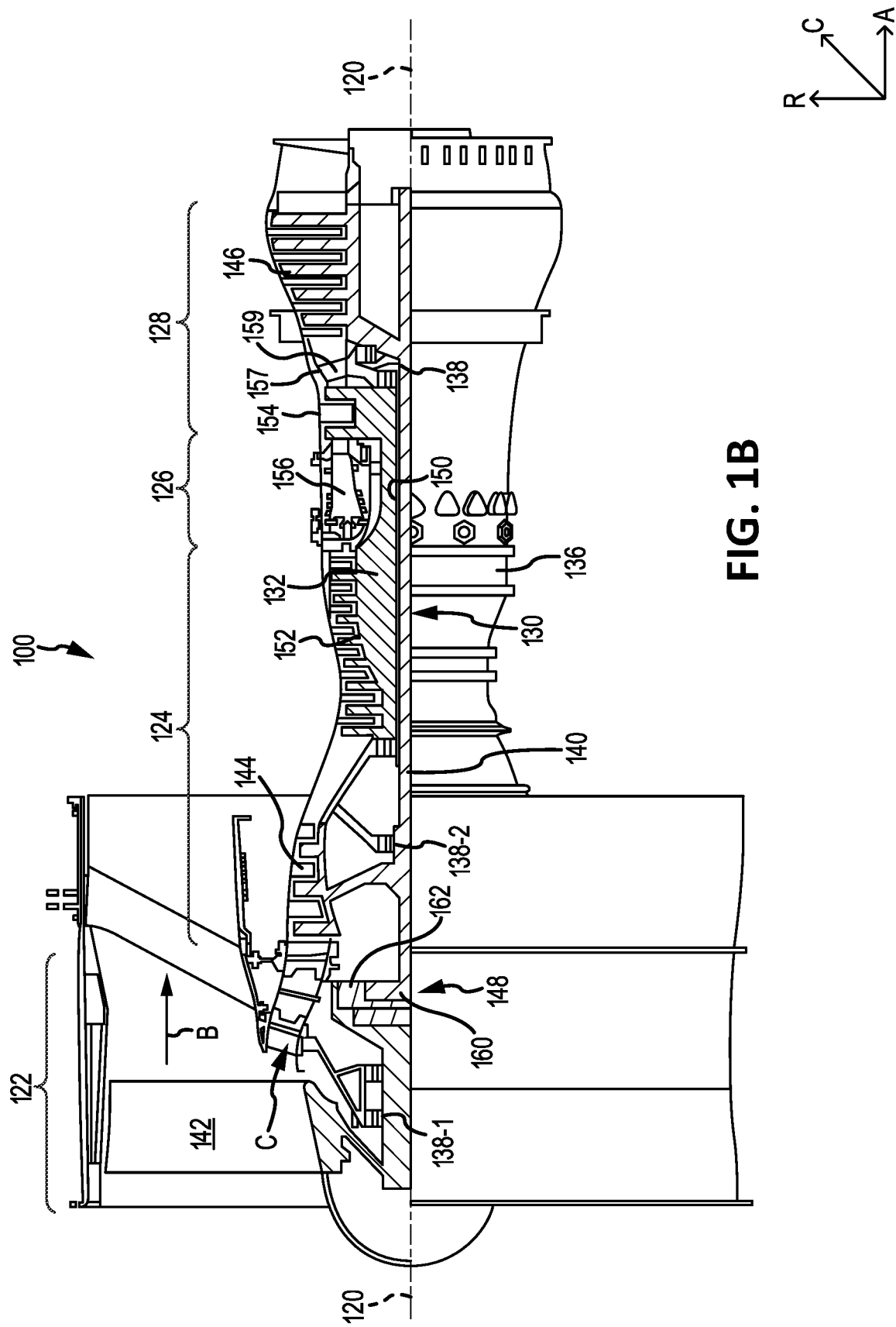
FIG. 1B illustrates a gas turbine engine, in accordance with various embodiments.

In various embodiments, and with reference to FIG. 1B, a gas turbine engine 100 is disclosed. Gas turbine engine 100 may be an example of engine 15 in FIG. 1A. As used herein, "aft" refers to the direction associated with a tail (e.g., the back end) of an aircraft, or generally, to the direction of exhaust of gas turbine engine 100. As used herein, "forward" refers to the direction associated with a nose (e.g., the front end) of the aircraft, or generally, to the direction of flight or motion. An A-R-C axis has been included to illustrate the axial (A), radial (R) and circumferential (C) directions. For clarity, axial axis A spans parallel to axis of rotation 120. As utilized herein, radially inward refers to the negative R direction towards axis of rotation 120, and radially outward refers to the R direction away from axis of rotation 120.

Gas turbine engine 100 may comprise a two-spool turbofan that generally incorporates a fan section 122 (example of fan 20 in FIG. 1A), a compressor section 124, a combustor section 126, and a turbine section 128. Gas turbine engine 100 may also comprise, for example, an augmenter section, and/or any other suitable system, section, or feature. In operation, fan section 122 may drive air along a bypass flow-path B, while compressor section 124 may further drive air along a core flow-path C for compression and communication into combustor section 126, before expansion through turbine section 128. FIG. 1 provides a general understanding of the sections in a gas turbine engine, and is not intended to limit the disclosure. The present disclosure may extend to all types of applications and to all types of turbine engines, including, for example, turbojets, turboshafts, and three spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

In various embodiments, gas turbine engine 100 may comprise a low speed spool 130 and a high speed spool 132 mounted for rotation about an axis of rotation 120 relative to an engine static structure 136 via one or more bearing systems 138 (shown as, for example, bearing system 138-1 and bearing system 138-2 in FIG. 1). It should be understood that various bearing systems 138 at various locations may alternatively or additionally be provided, including, for example, bearing system 138, bearing system 138-1, and/or bearing system 138-2.

In various embodiments, low speed spool 130 may comprise an inner shaft 140 that interconnects a fan 142, a low pressure (or a first) compressor section 144, and a low pressure (or a second) turbine section 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 may couple inner shaft 140 to a rotating fan structure. High speed spool 132 may comprise an outer shaft 150 that interconnects a high pressure compressor ("HPC") 152 (e.g., a second compressor section) and high pressure (or a first) turbine section 154. A combustor 156 may be located between HPC 152 and high pressure turbine 154. A mid-turbine frame 157 of engine static structure 136 may be located generally between high pressure turbine 154 and low pressure turbine 146. Mid-turbine frame 157 may support one or more bearing systems 138 in turbine section 128. Inner shaft 140 and outer shaft 150 may be concentric and may rotate via bearing systems 138 about axis of rotation 120. As used herein, a "high pressure" compressor and/or turbine may experience a higher pressure than a corresponding "low pressure" compressor and/or turbine.

In various embodiments, the air along core airflow C may be compressed by low pressure compressor 144 and HPC 152, mixed and burned with fuel in combustor 156, and expanded over high pressure turbine 154 and low pressure turbine 146. Mid-turbine frame 157 may comprise airfoils 159 located in core airflow path C. Low pressure turbine 146 and high pressure turbine 154 may rotationally drive low speed spool 130 and high speed spool 132, respectively, in reaction to the expansion exhaust gases.

In various embodiments, gas turbine engine 100 may comprise a high-bypass ratio geared aircraft engine. The bypass ratio of gas turbine engine 100 may also be greater than ten (10:1). Geared architecture 148 may be an epicyclic gear train, such as a star gear system (sun gear in meshing engagement with a plurality of star gears supported by a carrier and in meshing engagement with a ring gear) or other gear system. Geared architecture 148 may have a gear reduction ratio of greater than about 2.3 and low pressure turbine 146 may have a pressure ratio that is greater than about five (5). The diameter of fan 142 may be significantly larger than that of the low pressure compressor section 144, and the low pressure turbine 146 may have a pressure ratio that is greater than about five (5:1). The pressure ratio of low pressure turbine 146 is measured prior to inlet of low pressure turbine 146 as related to the pressure at the outlet of low pressure turbine 146. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in high pressure compressor 152 than are conventionally experienced. These higher operating temperatures and pressure ratios create operating environments that cause thermal loads that are higher than the thermal loads conventionally experienced, which may shorten the operational life of current components.

Figures 2A, 2B:
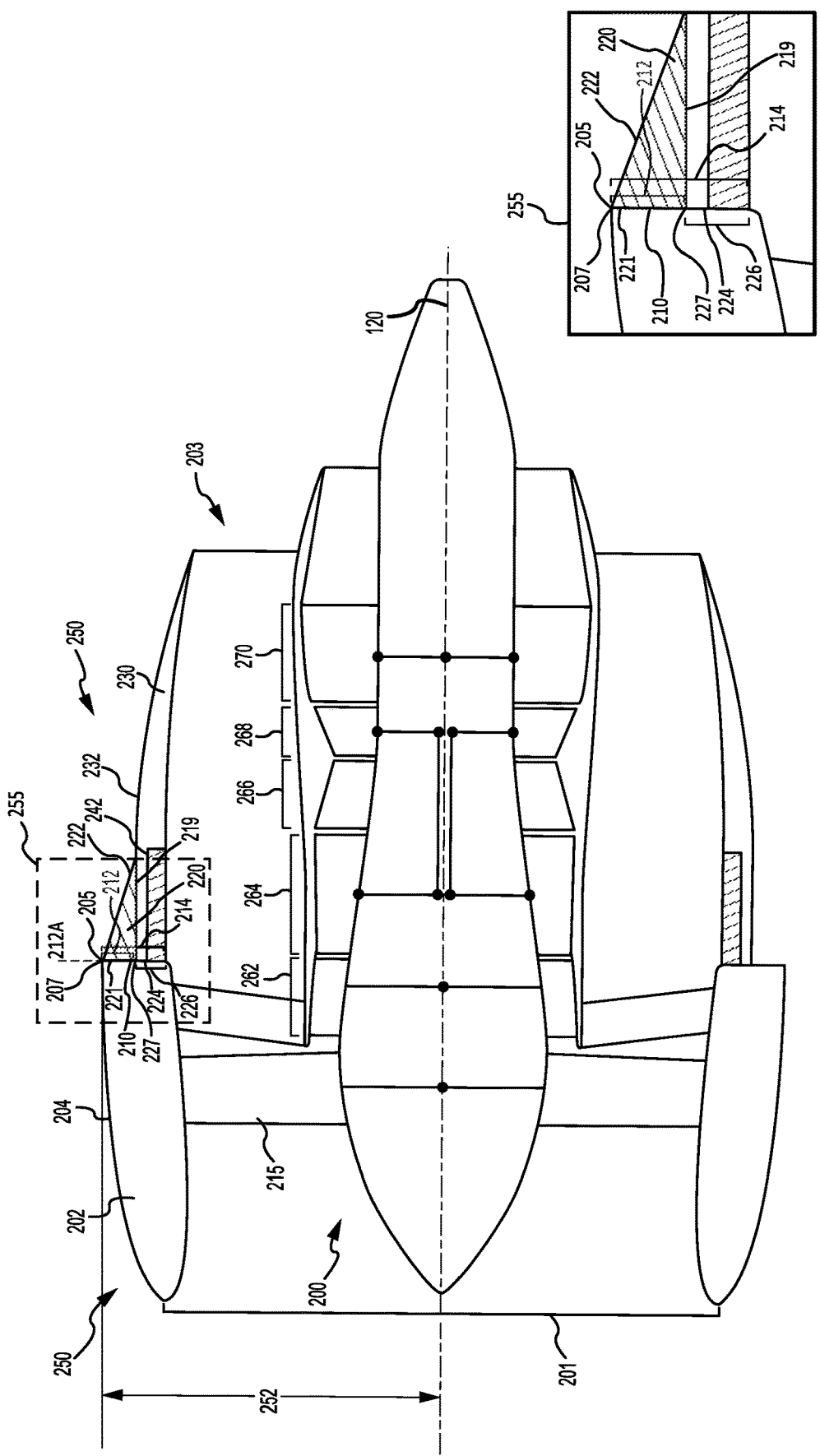
FIGS. 2A and 2B illustrate a nacelle comprising a transition fairing between cowlings, in accordance with various embodiments.

With reference to FIGS. 2A and 2B (FIG. 2B depicting an enlarged view of area 255 from FIG. 2A), a nacelle 250 may encircle a gas turbine engine 200 (an example of engine 15 and 100 in FIGS. 1A and 1B, respectively) comprising a fan 215, a high pressure compressor section 262, a low pressure compressor section 264, a combustor section 260, a high pressure turbine section 268, and/or a low pressure turbine section 270. In various embodiments, nacelle 250 may comprise an inlet 201 defined by an inlet cowling 202 and an outlet 203 defined by a boat tail cowling 230. In various embodiments, inlet cowling 202 may comprise an inlet cowling external surface 204, defining the outermost circumferential surface of inlet cowling 202, and an inlet cowling aft edge 210, which is the aft-most edge of inlet cowling 202. In various embodiments, inlet cowling external surface 204 may comprise one or multiple parts. In various embodiments in which inlet cowling external surface 204 comprises multiple parts, at least one of which may be movable to allow access to components inside nacelle 250. Inlet cowling aft edge 210 may comprise an aft edge length 214, which is a length extending in a direction radially from axis of rotation 120. Inlet cowling aft edge 210 may comprise an outer point 205, which is the radially outermost point of inlet cowling aft edge 210. In various embodiments, outer point 205 may be at the same point as an inlet cowling maximum point 207, which is the most radially outward point on inlet cowling external surface 204, depicted by length 252.

In various embodiments, inlet cowling aft edge 210 may be disposed aft of fan 215, and/or radially outward of low pressure compressor section 262, high pressure compressor section 264, and/or combustor section 266.

In various embodiments, boat tail cowling 230 may comprise a boat tail cowling external surface 232, defining the radially outermost circumferential surface of boat tail cowling 230, and a boat tail cowling forward edge 224, which is the forward-most edge of boat tail cowling 230. In various embodiments, boat tail cowling 230 may be coupled and/or disposed adjacent to a thrust reverser 242. In various embodiments, boat tail cowling 230 may be configured to translate in an aft direction, and in response, thrust reverser 242 may be exposed to create reverse thrust in order to slow or stop an aircraft. In various embodiments, thrust reverser 242 may translate with boat tail cowling 230, or remain stationary. In various embodiments, boat tail cowling 230 may be configured to remain stationary (i.e., not configured to translate in an aft direction). In various embodiments, thrust reverser 242 may be disposed radially inward of boat tail cowling external surface 232 and/or boat tail cowling 230.

In various embodiments, boat tail cowling forward edge 224 may be coupled to and/or disposed adjacent to inlet cowling aft edge 210. Boat tail cowling forward edge 224 may comprise an outer point 227, which is the radially outermost point of boat tail cowling forward edge 224. In various embodiments, a forward edge length 226 of boat tail cowling forward edge 224, which is a length extending in a direction radially from axis of rotation 120, may be shorter than aft edge length 214. Therefore, a step 212 is formed between outer point 205 of inlet cowling aft edge 210 and outer point 227 of boat tail cowling forward edge 224, step 212 being the portion of inlet cowling aft edge 210 that extends above (i.e., more radially outward) than boat tail cowling forward edge 224. Stated another way, outer point 205 of inlet cowling aft edge 210 is more radially outward than outer point 227 of boat tail cowling 230 relative to axis of rotation 120. In various embodiments, step 212 may be disposed aft of inlet cowling maximum point 207 and/or forward of thrust reverser 242, at least in response to boat tail cowling 230 being disposed in an exposed configuration (i.e., boat tail cowling having translated in an aft direction to expose thrust reverser 242, or exposing thrust reverser 242 another way in embodiments in which boat tail cowling 230 is stationary).

In various embodiments, nacelle 250 may further comprise a transition fairing 220 coupled to boat tail cowling 230 radially outward of boat tail cowling 230. Transition fairing 220 may comprise an inner surface 219, a forward surface 221, and a fairing ramp surface 222. Inner surface 219 may be coupled and/or disposed adjacent to boat tail cowling external surface 232, and forward surface 221 may be coupled and/or disposed adjacent to inlet cowling aft edge 210. Transition fairing 220 may be disposed adjacent to at least a portion of step 212, wherein fairing ramp surface 222 may provide a transition surface between inlet cowling aft edge 210 and boat tail cowling external surface 232. In various embodiments, there may be a discontinuity between fairing ramp surface 222 and boat tail cowling external surface 232. In various embodiments, forward surface 221 of transition fairing 220 may not span the same distance as step 212, i.e., forward surface 221 may not extend radially outward as far as outer point 205. In various embodiments, transition fairing 220 may be disposed radially outward of thrust reverser 242.

In various embodiments, transition fairing 220 may be fixedly coupled to, and/or integral with, boat tail cowling 230. "Integral" in this context may mean no splits in material between boat tail cowling 230 and transition fairing 220, or that boat tail cowling 230 and transition fairing 220 are part of a monolithic whole. In various embodiments, with momentary reference to FIGS. 2A, 2B, 3A, and 3B, a transition angle 353 formed between fairing ramp surface 222, 322 and a reference line 315 parallel to axis of rotation 120 may be between 10 and 20 degrees, 12 and 17 degrees, 11 and 15 degrees, 15 and 19 degrees, or any other suitable angle.

The presence of step 212 and transition fairing 220 allows for various benefits. The smaller circumference (or cross section) of boat tail cowling 230 and transition fairing 220 compared to that of inlet cowling 202 decreases the surface area of boat tail cowling external surface 232, and therefore, of nacelle 250 as a whole. Therefore, with less surface area of the external surface of nacelle 250, there is less surface area friction and drag caused by the airflow contacting the outer surfaces of nacelle 250 than if there were a flush surface between an inlet cowling and a boat tail cowling. Additionally, the smaller circumference of boat tail cowling 230 and transition fairing 220 than inlet cowling 202 decreases the amount of material in nacelle 250, decreasing the weight of nacelle 250. Both these aspects of the present disclosure may improve efficiency of engine 200 in moving the aircraft in flight, thus, improving fuel efficiency. Furthermore, with a decreased circumference of boat tail cowling 230 and transition fairing 220, the diameter of engine 200 and/or fan 215 may be increased (allowing more bypass air through engine 200 to increase thrust and fuel efficiency) without a need to increase the height of the aircraft or length of landing gear to allow for clearance between nacelle 250 and a landing surface, as well as between nacelle 250 and the aircraft wing. That is to say, fan 215 and/or engine 200 may increase in size (e.g., diameter), and nacelle 250 may be coupled on a wing of an aircraft closer to the wing because of the extra clearance provided by boat tail cowling 230, step 212, and transition fairing 220. Regarding airflow during flight, step 212 allows the shock wave 212A formed by passing airflow to be positioned at step 212. This allows laminar flow along inlet cowling 202, shock at step 212, then recovery of smoother airflow after the shock into laminar flow along boat tail cowling 230 until boat tail cowling 230 begins to taper radially inward toward the aft end. The presence of transition fairing 220 allows less of a shock wave 212A at step 212 to occur, because fairing ramp surface 222 provides a transition surface for airflow from outer point 205 inlet cowling aft edge 524 and boat tail cowling external surface 232.

With reference to FIGS. 3A and 3B (FIG. 3B depicting an enlarged view of area 355 from FIG. 3A), in various embodiments, nacelle 350 may comprise an inlet cowling 302 having an inlet cowling maximum point 307 of inlet cowling external surface 304 that may not be at the same position as outer point 305 of step 312. Therefore, step 312 may be disposed aft of inlet cowling maximum point 307, and aft edge length 314 of inlet cowling aft edge 310, and the radial distance of step 312, may be less than the embodiment pictured in FIGS. 2A and 2B (in which outer point 205 of step 212 is at the same position as inlet cowling maximum point 207). In various embodiments, with momentary combined reference to FIGS. 2A, 2B, 3A, and 3B, step 312 may be between 1% and 10% less than step 212, between 2% and 6% less than step 212, or between 6% and 10% less than step 212. The surface between inlet cowling maximum point 307 and outer point 305 may be a convergent surface 308 sloping between inlet cowling maximum point 307 and outer point 305. Such embodiments may allow control of the shockwave 312A so that it is located at or near step 312.

In various embodiments, convergent surface 308 may be substantially flat (e.g., wherein the term "substantially" in this context only may refer to plus or minus 5 degrees), convex, or concave to affect the aerodynamics of nacelle 350. In various embodiments, a convergent surface angle formed between convergent surface 308 and an axial reference line parallel to axis of rotation 120 may be 0.01 and 18 degrees, between 5 and 12 degrees, between 10 and 18 degrees, between 1 and 10 degrees, or any other suitable angle. In various embodiments, forward surface 321 of transition fairing 320 may span the same radial distance as step 312. Therefore, fairing ramp surface 322 of transition fairing 320 may be flush with convergent surface 308 of inlet cowling 302. Fairing ramp surface 322 may have a different transition angle 353 than the convergent surface angle of convergent surface 308, or transition angle 353 and the convergent surface angle of convergent surface 308 may be the same. In various embodiments, forward surface 321 of transition fairing 320 may not span the same distance as step 312, i.e., forward surface 321 may not extend radially outward as far as outer point 305.

Figure 4:
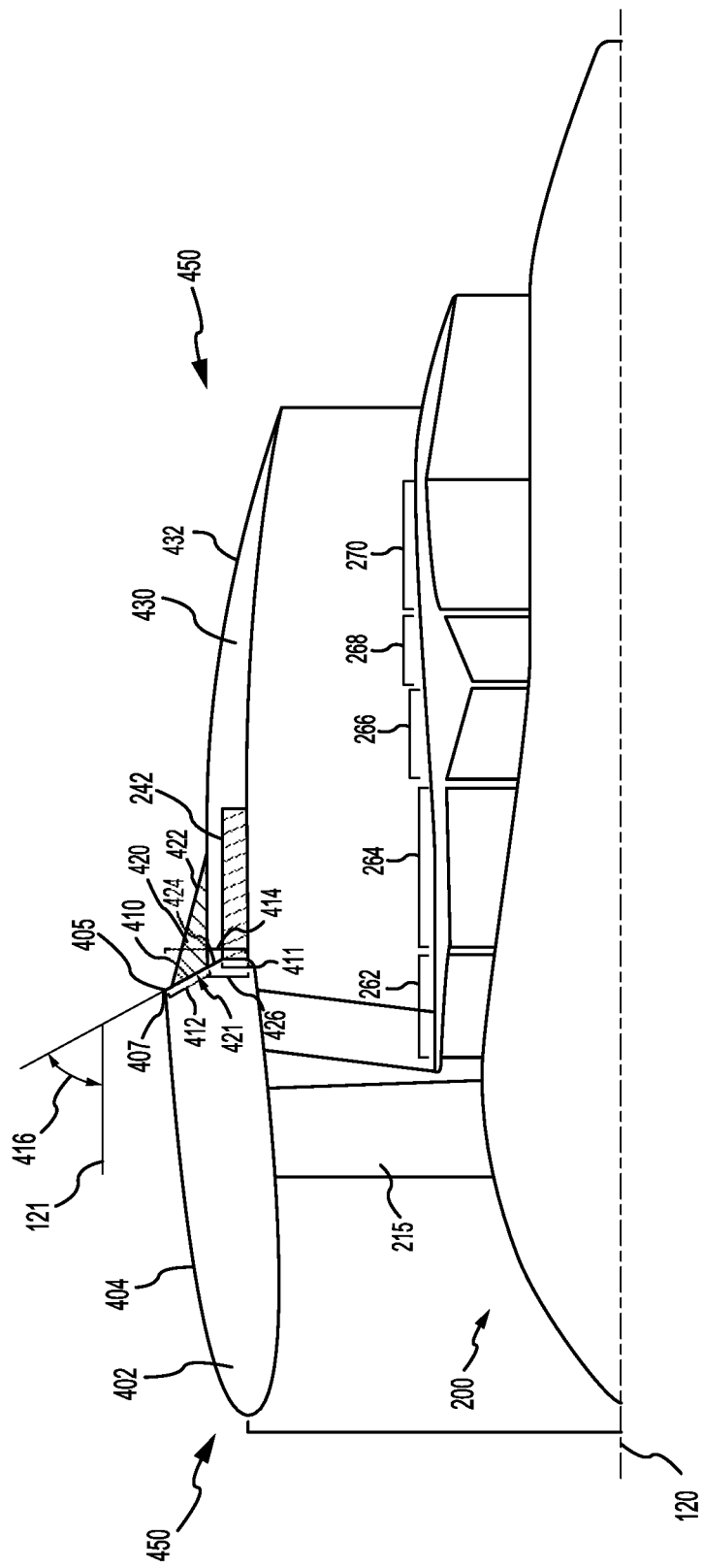
FIG. 4 illustrates a nacelle comprising an angled step and a transition fairing between cowlings, in accordance with various embodiments.

With reference to FIG. 4, in various embodiments, nacelle 450 may comprise inlet cowling 402, having an inlet cowling external surface 404 and inlet cowling aft edge 410. In various embodiments, inlet cowling aft edge 410 may be angled forward or aft relative to a perpendicular position to axis of rotation 120. Therefore, step 412 between inlet cowling maximum point 407 (which may also be outer point 405 of inlet cowling aft edge 410) may be angled along at least a portion of inlet cowling aft edge 410 and/or aft edge length 414. In various embodiments, a portion of step 412 may be angled, while a thrust reverser portion 411 may not be angled (i.e., substantially perpendicular to axis of rotation 120 (plus or minus 5 degrees)).

In various embodiments, boat tail cowling forward edge 424 may be complementarily angled at least partially along forward edge length 426 to the angle of inlet cowling aft edge 410 such that boat tail cowling forward edge 424 remains adjacent to inlet cowling aft edge 410 when boat tail cowling 430 is in its forward-most configuration (i.e., boat tail cowling 430 has not translated aft to expose thrust reverser 242 in embodiments in which boat tail cowling 430 is configured to translate). In various embodiments, the angle 416 formed between step 412 and an axial reference line 121 parallel to axis of rotation 120 may be between 45 and 90 degrees, 60 and 80 degrees, 75 and 90 degrees, 50 and 65 degrees, or any other suitable angle. Such angling of step 412 may cause similar aerodynamic benefits as discussed in relation to FIGS. 3A and 3B and convergent surface 308. Likewise, forward surface 421 of transition fairing 420 may be complementarily angled at least partially along step 412 such that forward surface 421 remains adjacent to inlet cowling aft edge 410 when boat tail cowling 430 is in its forward-most configuration (i.e., boat tail cowling 430 has not translated aft to expose thrust reverser 242). Therefore, fairing ramp surface 422 may provide a transition surface between boat tail cowling external surface 432 and step 412. In various embodiments, forward surface 421 may span a portion or the entire length of step 412.

Figure 5A:
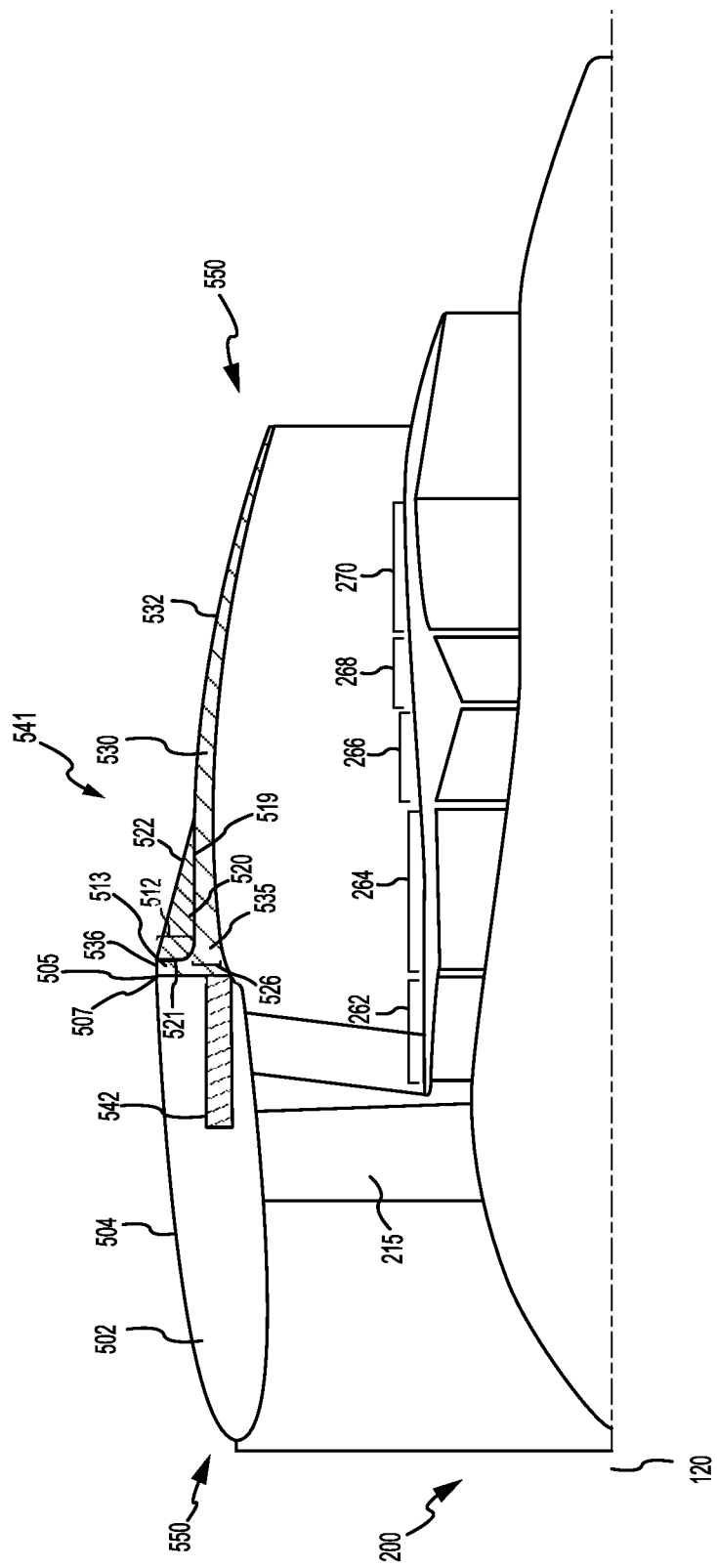
FIG. 5A illustrates a nacelle comprising an additional example of a transition fairing between cowlings, in accordance with various embodiments.
Figure 5B:
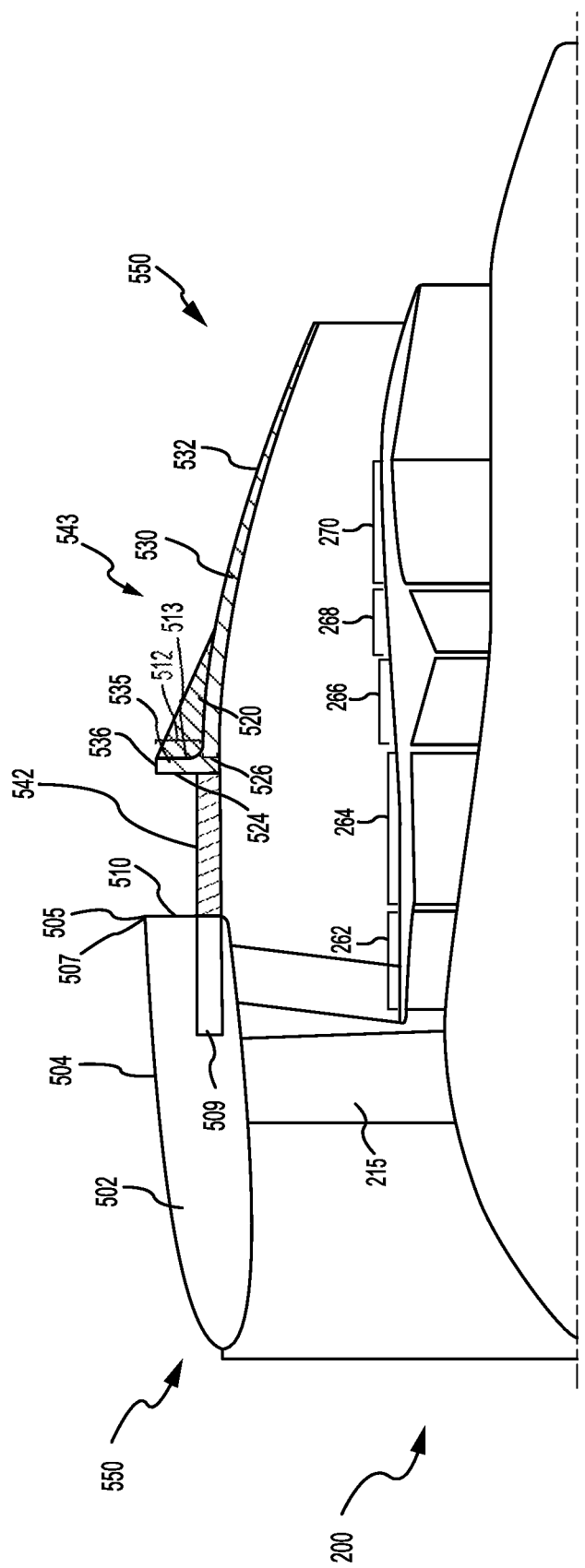
FIG. 5B illustrates a nacelle comprising the additional example of a transition fairing between cowlings exposing a thrust reverser, in accordance with various embodiments.

In various embodiments, with reference to FIGS. 5A and 5B, nacelle 550 may comprise an inlet cowling 502 comprising a thrust reverser housing 509, in which thrust reverser 542 may be disposed in response to boat tail cowling 530 being in a forward-most configuration 541 (as shown in FIG. 5A). In various embodiments, boat tail cowling external surface 532 of boat tail cowling 530 may create step 512 by having a radial flange 513 protruding radially outward from a boat tail cowling forward portion 535, wherein radial flange 513 comprises boat tail cowling forward edge 524. That is, a flange outer point 536 of radial flange 513 may be more radially outward from axis of rotation 120 than a laminar portion distance 526 of boat tail cowling 530 such that step 512 is formed. Step 512 may be the portion of radial flange 513 more radially outward than laminar portion distance 526.

In various embodiments, flange outer point 536 may be the same distance radially outward of axis of rotation 120 as outer point 505 of inlet cowling aft edge 510 (the most radially outward point of inlet cowling aft edge 510) such that inlet cowling external surface 504 is flush with flange outer point 536 (i.e., flange outer point 536 is the same distance radially outward from axis of rotation 120 as outer point 505 of inlet cowling aft edge 510 and/or inlet cowling maximum point 507). In various embodiments in which outer point 505 and inlet cowling maximum point 507 are not at the same position on inlet cowling external surface 504, there may be a convergent surface (similar to convergent surface 308 in FIGS. 3A and 3B) between inlet cowling maximum point 507 and outer point 505 and/or flange outer point 536. In various embodiments, flange outer point 536 may not be at the same height (where height refers to a radially outward distance from axis of rotation 120) as outer point 505 of inlet cowling aft edge 510, such that there is a step between flange outer point 536 and outer point 505 of inlet cowling aft edge 510. In various embodiments, flange outer point 536 may be angled, concave, or convex in any suitable manner to affect the aerodynamics of nacelle 550 in flight.

In various embodiments, transition fairing 520 may be coupled to boat tail cowling 530, wherein inner surface 519 is coupled and/or disposed adjacent to boat tail cowling external surface 532, and forward surface 521 is coupled and/or disposed adjacent to radial flange 513. Fairing ramp surface 522 may provide a transition surface between radial flange 513 and boat tail cowling external surface 532. In various embodiments, forward surface 521 may span radially outward the same distance as flange outer point 536, or may span less radially outward than flange outer point 536.

In various embodiments, with further reference to FIGS. 5A and 5B, boat tail cowling 530 may be configured to translate aft to an exposed configuration 543 to expose thrust reverser 542 to create reverse thrust to slow or stop an aircraft. Exposed configuration 543 may be any translation of boat tail cowling 530 in an aft direction such that any portion of thrust reverser 542 is exposed. In such embodiments, thrust reverser 542 may be coupled to boat tail cowling forward edge 524 such that in response to boat tail cowling 530 translating in an aft direction, thrust reverser 542 likewise translates aft, out thrust reverser housing 509 to become exposed and utilized. In various embodiments comprising radial flange 513, the thrust reverser may be disposed radially inward of boat tail cowling 530 when boat tail cowling 530 is in forward-most configuration 541, similar to the disposition of thrust reverser 242 in FIGS. 2A-4.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A nacelle configured to encircle an engine disposed about an axis of rotation, comprising:
    an inlet cowling defining an inlet of the nacelle, wherein the inlet cowling comprises an inlet cowling outer surface defining an outermost circumferential surface of the inlet cowling and an inlet cowling aft edge spanning radially inward from the inlet cowling outer surface, wherein the inlet cowling aft edge comprises an aft edge length and an aft edge outer point which is a radially outermost point of the inlet cowling aft edge;
    a boat tail cowling disposed aft of the inlet cowling, wherein the boat tail cowling comprises a radial flange protruding radially outward from a boat tail cowling forward portion and a boat tail cowling outer surface aft of the radial flange, wherein the boat tail cowling outer surface defines an outermost circumferential surface of the boat tail cowling, wherein the radial flange comprises a boat tail forward edge disposed adjacent to the inlet cowling aft edge,
    wherein the boat tail cowling comprises a step formed by a flange outer point of the radial flange being more radially outward from the axis of rotation than a laminar portion distance of the boat tail cowling, wherein the laminar portion distance is a radial thickness of the boat tail cowling for which a radially outermost surface is the boat tail cowling outer surface, the step being defined by a portion of the radial flange that is radially outward of the laminar portion distance; and
    a transition fairing coupled to the boat tail cowling outer surface of the boat tail cowling, wherein the transition fairing comprises a fairing forward edge disposed adjacent to the radial flange and a fairing ramp surface providing a transition surface between the radial flange and the boat tail cowling outer surface, wherein there is a discontinuity between the fairing ramp surface and the boat tail cowling outer surface.

2. The nacelle of claim 1, further comprising a thrust reverser coupled to the inlet cowling and the boat tail cowling, wherein the boat tail cowling is configured to translate in an aft direction, wherein the boat tail forward edge is disposed adjacent to the inlet cowling aft edge when the boat tail cowling is in a forward-most configuration, wherein the thrust reverser is configured to be in an exposed configuration in response to the boat tail cowling translating in the aft direction.

3. The nacelle of claim 2, wherein, when the boat tail cowling is in the forward-most configuration, the transition fairing is disposed radially outward of the thrust reverser.

4. The nacelle of claim 2, wherein, when the boat tail cowling is in the forward-most configuration, the step is disposed aft of the thrust reverser.

* * * * *